UNITED STATES PATENT OFFICE.

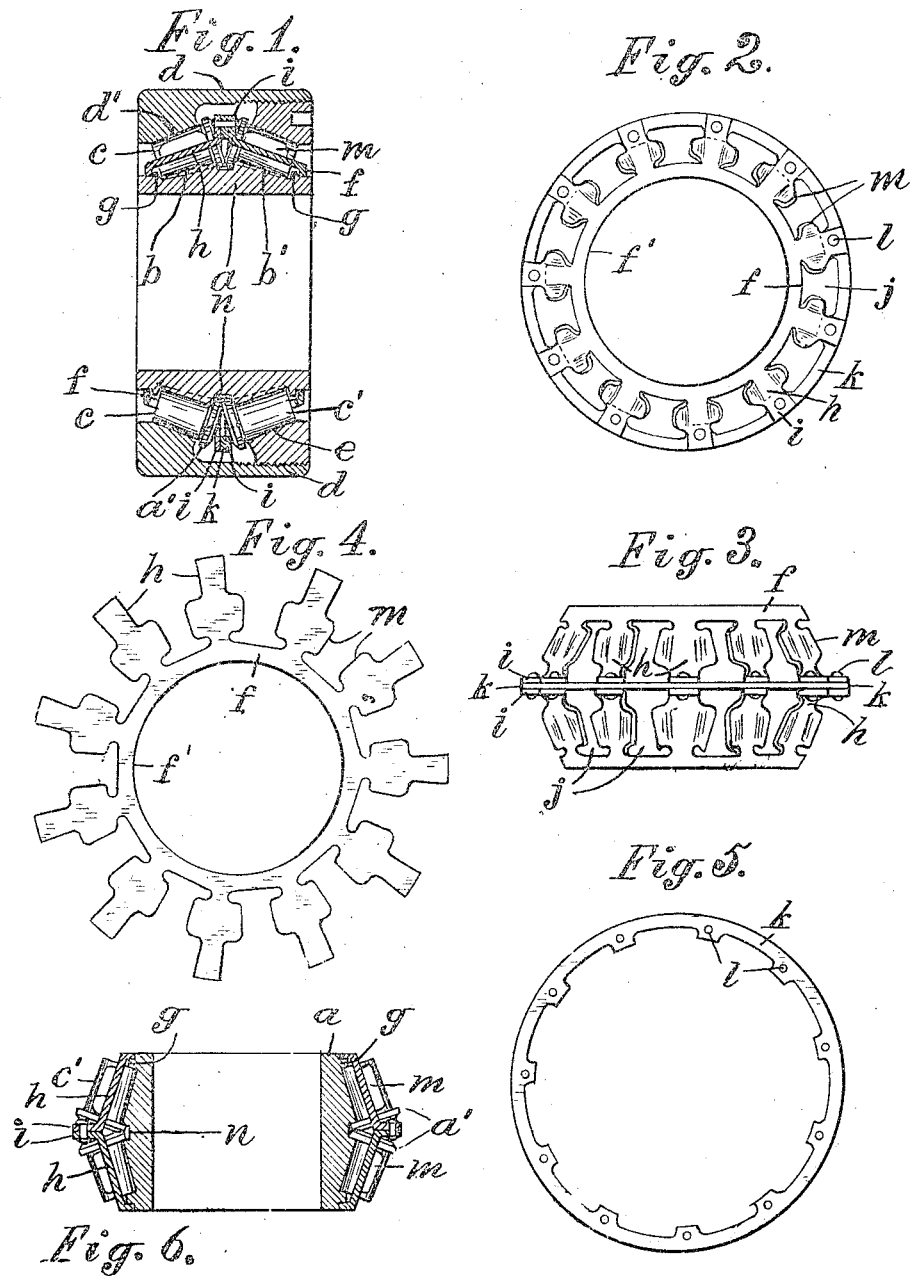

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

DOUBLE CAGE FOR ROLLER-BEARINGS.

1,064,974.    Specification of Letters Patent.    Patented June 17, 1913.

Application filed January 2, 1912. Serial No. 668,832.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Double Cages for Roller-Bearings, fully described and represented in the following specification and the accompanying drawings, forming a part of the same.

This invention relates to a special construction for a sheet-metal cage adapted to guide the rolls in their movement upon the hub of a roller-bearing; and, if desired, to retain the rolls upon the same independently of the casing, so as to hold the rolls in position while adjusting the casing thereon.

The invention is especially applicable to a bearing having a double conical hub with two sets of rolls applied to the conical seats upon the opposite ends of the hub. In such a bearing a doubly tapered cage is required in correspondence with the double conical form of the hub and provided with partitions to keep the rolls in their working positions. Such cages have heretofore been made with sheet-metal rings having an integral connection with both ends of the partition-bars, as in my prior Patent No. 954,929 granted April 12, 1910; but where such a cage has integral rings or collars at both ends it must be stamped into dish-form before the openings for the rolls can be made. The stamping of the openings separately in such dish-formed cage involves many operations and considerable cost, and the present construction avoids such cost, by forming the partitions as inclined prongs united with only one of the rings or cage-heads. For a doubly conical hub, the cage thus requires to be made in two sections, and the adjacent ends of the prongs are therefore formed of lugs projected outwardly and perforated for rivets so that the two sections of the cage can be connected permanently together by rivets after they are fitted over the rolls upon the hub.

I am aware that it is old to make a cylindrical cage with circular heads of the same diameter and partitions integral with one of the heads between which rolls can be guided. This construction permits the partitions to be stamped integral with one of the heads from a flat sheet of metal, the same as the partitions are made integral with the ring $f$ in my construction, but no prior construction has ever furnished a means of making a doubly tapered cage with inclined partitions having their ends joined together with or without the intermediate ring $k$, as shown in Figs. 3 and 6 respectively. I therefore disclaim the mere stamping of the partitions from a flat sheet in one piece with the ring $f$, and limit my invention to a cage having tapering sections joined together by means of partitions made separate from one another at their adjacent ends, and connected by rivets after the rolls are inserted between the partitions, with or without an intermediate ring $k$.

In the annexed drawing, Figure 1 is a longitudinal section of a bearing having the cage thus constructed; Fig. 2 is an end view of the cage; Fig. 3 is an edge view of the cage, and Fig. 4 shows the ring with prongs projected radially therefrom, to make each section of the cage separately. Fig. 5 is an elevation of the collar for joining the ends of the prongs; and Fig. 6 shows a cage having the ends of the prongs united directly together without the intervention of a collar.

$a$ designates the double conical hub with sloping seats $b, b'$, with a groove $n$ at their bases, and two separate sets of rolls $c, c'$ fitted to the said seats.

The casing $d$ is shown with an integral seat $d'$ in one end and a removable seat $e$ screwed into the other end. The rolls are shown with collared heads $a'$ at their adjacent ends, which heads are held in contact with one another by the pressure of the casing and hub upon the tapering sides of the rolls. The particular construction of the casing and the rolls is immaterial, as the cage described herein may be used with other constructions.

The sheet-metal is first punched out, as shown in Fig. 4, with a narrow ring $f$ having a central bore $f'$, and prongs $h$ projected from such ring and provided with the lips $m$. The sheet-metal is then stamped to incline the prongs from the ring in correspondence with the slope of the seats $b, b'$. The bore $f'$ is adapted to ride upon the outer end of the hub in proximity to a shoulder upon a collar $g$. The ends of the prongs are bent outwardly to form lugs $i$ which lie in a flat plane, and such lugs are secured together to unite the two sections of the cage. Such lugs may be united directly by rivets, as is clearly shown in Fig. 6, or to an intermediate collar *k* by rivets extended through the lugs and collar, as shown in Figs. 1 and 2. Such uniting of the two sections secures the cage permanently in position upon the hub but capable of rotating thereon. The pockets *j* in which the rolls revolve are made longer than the rolls to avoid contact with the same at either end, and the cage is held from end movement by the collars *g* upon the hub. The clearance between the cage and the ends of the rolls avoids all friction by contact at those points, which is possible where the larger ends of the rolls contact with one another so as not to require guiding longitudinally. The cage is thus guided upon the hub independently of the rolls by the contact of the rings *f* with the ends of the hub and the collars *g*, and the friction of the parts is materially less than where the cage is not guided upon the hub but its weight is supported by the rolls during their movements together. Lips *m* are shown projected from opposite edges of each prong and are bent to slope over the outer sides of the rolls to retain them upon the seats of the hub. With this construction, one series of the rolls is held on the hub while the prongs of one cage-section are slipped between the rolls. The collar *k* is then applied and the other set of rolls and their cage-section are applied to the opposite end of the hub, and the adjacent ends of the prongs united by rivets inserted through the same and the collar *k*, thus retaining the cage and rolls upon the hub.

The material of the cage is made of sufficient thickness to make the lips *m* rigid upon the prongs *h* so as to retain their relation to the prongs unchangeably. A groove *n* is formed upon the hub at the junction of the conical seats *b*, *b'*, to receive the enlarged heads *a'* of the rolls, which roll against one another without any rubbing friction.

Fig. 6 shows a cage with the opposed lugs riveted directly together, which retains them in their working position effectively, as the metal of the prongs is made sufficiently thick to retain their form and position rigidly. The engagement of the rings *f* with the shoulders upon the hub prevents end movement of the cage and avoids any end contact of the cage and rolls which would produce unnecessary friction.

The advantage of making the prongs disconnected at their outer ends is very great, as it permits the prongs to be made with the necessary interspaces in one operation by stamping them from a flat sheet of metal, which is not possible if the prongs are made integral with a ring at their outer ends, because such ring is too large for the finished cage, and a cage with ring of suitable size can only be formed by pressing the sheet-metal into dish-shape before the pockets *j* are cut out to form the prongs *h*. Such pockets can only be stamped one at a time from the dish-shaped blank, which involves a very tedious and costly operation; whereas all of the pockets and prongs can be stamped at a single operation if they be disconnected at their outer ends and subsequently attached to one another or to a ring of the desired size, as shown in Fig. 3. The present improvement thus greatly decreases the cost of manufacture, and distinguishes my construction fully from that of my former Patent No. 954,529 granted April 12, 1910, in which the prongs are constructed with integral rings at both ends.

Having thus set forth the nature of the invention what is claimed herein is:

In a roller bearing, the combination, with a hub having conical seats with their bases adjacent, of two sets of rolls fitted to the seats, and a cage for guiding the two sets of rolls consisting of two similar dish-shaped sections each having the ring *f* fitted to turn upon one end of the hub, prongs *h* inclined outwardly from the rings toward one another forming partitions between the said rolls, lugs bent outwardly upon the adjacent free ends of the prongs and provided with rivet-holes, and rivets inserted through the said holes for securing the sections together after the sections are fitted over the rolls upon the hub, as and for the purpose set forth.

In testimony whereof I have hereunto set my hand in the presence of two subscribing witnesses.

CHARLES S. LOCKWOOD.

Witnesses:
G. C. STULTS,
ETHEL WILLIAMS.